(12) United States Patent
Nakama

(10) Patent No.: US 12,360,068 B2
(45) Date of Patent: Jul. 15, 2025

(54) THERMAL CONDUCTIVITY DETECTOR

(71) Applicant: SHIMADZU CORPORATION, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 333 days.

(21) Appl. No.: 17/920,688

(22) PCT Filed: Apr. 24, 2020

(86) PCT No.: PCT/JP2020/017701
§ 371 (c)(1),
(2) Date: Dec. 10, 2022

(87) PCT Pub. No.: WO2021/214978
PCT Pub. Date: Oct. 28, 2021

(65) Prior Publication Data
US 2023/0146746 A1 May 11, 2023

(51) Int. Cl.
*G01N 25/18* (2006.01)

(52) U.S. Cl.
CPC ................... *G01N 25/18* (2013.01)

(58) Field of Classification Search
CPC ......... G01N 25/18; G01N 27/18; G01N 30/66
See application file for complete search history.

(56) References Cited

U.S. PATENT DOCUMENTS 6,338,823 B1    1/2002  Furukawa
8,302,459 B2 *  11/2012 Matsuhama ........... G01N 25/18
                                                73/25.05

(Continued)

FOREIGN PATENT DOCUMENTS

CN    105510493 A    4/2016
CN    110895268 A    3/2020
(Continued)

OTHER PUBLICATIONS

Written Opinion of the International Searching Authority for PCT application No. PCT/JP2020/017701, Jul. 7, 2020.
(Continued)

*Primary Examiner* — Freddie Kirkland, III
(74) *Attorney, Agent, or Firm* — Muir Patent Law, PLLC

(57) ABSTRACT

A thermal conductivity detector (1) includes: a cell block (2) provided therein with a measurement cell (10) serving as a space in which a filament (12) for exchanging heat with a gas is arranged, the cell block (2) being provided with a cell inlet (11) for introducing a gas into the measurement cell (10) and a cell outlet (13) for flowing out the gas from the measurement cell (10); an outlet flow path (4) communicated with the cell outlet (13) of the cell block (2); a buffer block (6) provided therein with a buffer space (14), the buffer block (6) having an inlet port (15) for introducing the gas into the buffer space (14) and a discharge port (16) for discharging the gas from the buffer space (14), the inlet port (15) being fluidly connected to the outlet flow path (4); and a discharge member (8) retaining a fluid resistance portion (20) for increasing fluid resistance of the discharge port (16), the discharge member (8) being attached to the buffer block (6) such that the gas discharged from the discharge port (16) passes through the fluid resistance portion (20), the discharge member (8) being configured to be detachable from the buffer block (6) together with the fluid resistance portion (20).

6 Claims, 2 Drawing Sheets

(56) References Cited

U.S. PATENT DOCUMENTS

| | | | | |
|---|---|---|---|---|
| 10,330,651 B2 * | 6/2019 | Nakama | ................ | G01N 30/62 |
| 2010/0242573 A1 * | 9/2010 | Matsuhama | ........... | G01N 25/18 |
| | | | | 73/25.03 |
| 2016/0103105 A1 | 4/2016 | Nakama et al. | | |
| 2020/0088696 A1 | 3/2020 | Nakama | | |
| 2024/0100451 A1 * | 3/2024 | Hoelzer | ................ | B01D 15/22 |

FOREIGN PATENT DOCUMENTS

| | | |
|---|---|---|
| JP | 1997-243532 | 9/1997 |
| JP | 2003-270231 A | 9/2003 |
| JP | 2005-083788 A | 3/2005 |
| JP | 2013-019892 A | 1/2013 |
| JP | 2016-080413 A | 5/2016 |
| JP | 2020-0041990 | 3/2020 |

OTHER PUBLICATIONS

Chinese First OA for corresponding application No. CN 202080100124.0 dated Feb. 18, 2025.

* cited by examiner

THERMAL CONDUCTIVITY DETECTOR

TECHNICAL FIELD

The present invention relates to a thermal conductivity detector which is one of detectors used for detecting components in a gas chromatograph.

BACKGROUND OF THE INVENTION

A thermal conductivity detector is known as one of the detectors used in a gas chromatograph. A thermal conductivity detector is provided with a filament arranged in a measurement cell through which a gas flows. A thermal conductivity detector quantifies the components in the gas by detecting the heat exchange amount between the filament and the gas. The heat exchange amount between the filament and the gas varies depending on the flow rate of the gas flowing through the measurement cell. Therefore, when the flow rate of the gas flowing through the measurement cell fluctuates, the baseline of the measurement data will also fluctuate, resulting in adverse effects of the analytical result.

For the reasons described above, it is important to keep the flow rate of the gas flowing through the measurement cell constant. A variation in the atmospheric pressure is one of factors that cause the change in the flow rate of the gas flowing through the measurement cell. Since the outlet of the measurement cell is open to the atmosphere, the pressure difference between the inlet of the measurement cell and the outlet thereof fluctuates as the atmospheric pressure fluctuates, thereby causing fluctuations of the flow rate of the gas flowing through the measurement cell. Considering the above, the following proposal has been made. That is, a buffer space is provided downstream of the measurement cell, and a constant fluid resistance is provided at the outlet of the buffer space. This prevents atmospheric pressure fluctuations from being transmitted to the outlet of the measurement cell, thereby suppressing pressure fluctuations at the outlet of the measurement cell to stabilize the baseline of the measurement data (see Patent Document 1).

PRIOR ART DOCUMENT

Patent Document

Patent Document 1: Japanese Unexamined Patent Application Publication No. 2016-080413

SUMMARY OF THE INVENTION

Problems to be Solved by the Invention

In the case of providing a buffer space downstream of the measurement cell, the larger the volume of the buffer space and the larger the fluid resistance of the outlet of the buffer space, and therefore, the suppression effect of the pressure fluctuations at the outlet of the measurement cell can be enhanced, thereby stabilizing the baseline. On the other hand, in the case of providing a buffer space with a large capacity downstream of the measurement cell, the detector becomes larger in size. To stabilize the baseline while reducing the capacity of the buffer space, it is required to increase the fluid resistance by, for example, reducing the flow path inner diameter of the outlet of the buffer space. However, when the fluid resistance at the outlet of the buffer space is increased, a sample is likely to be clogged at the portion.

The present invention has been made in view of the above-described problems and aims to achieve both the stabilization of the baseline and the miniaturization of the detector.

Means for Solving the Problems

A thermal conductivity detector according to the present invention includes:
a cell block provided therein with a measurement cell serving as a space in which a filament for exchanging heat with a gas is arranged, the cell block being provided with a cell inlet for introducing the gas into the measurement cell and a cell outlet for flowing out the gas from the measurement cell;
an outlet flow path communicated with the cell outlet of the cell block;
a buffer block provided therein with a buffer space, the buffer block having an inlet port for introducing the gas into the buffer space and a discharge port for discharging the gas from the buffer space, the inlet port being fluidly connected to the outlet flow path; and
a discharge member retaining a fluid resistance portion for increasing fluid resistance of the discharge port, the discharge member being attached to the buffer block such that the gas discharged from the discharge port passes through the fluid resistance portion, the discharge member being configured to be detachable from the buffer block together with the fluid resistance portion.

The subject matter of the present invention is to make it easy to replace a fluid resistance portion when clogging has occurred in the fluid resistance portion for increasing the fluid resistance of the outlet port of the buffer space. Here, examples of the fluid resistance portion include a resistance tube and a filter. In a case where the fluid resistance portion is realized by a resistance tube, it is required to attach a fine resistance tube having an outer diameter of equal to or less than 1 mm depending on the reduction in the buffer space volume to the buffer block. However, such a fine resistance tube cannot be attached to the discharge port of the buffer space in the same connection method as that for a typical pipe. In the present invention, it is configured such that the fluid resistance portion is retained by the discharge member detachably attached to the buffer block, and the fluid resistance portion is detachably attached to the buffer block by detachably attaching the discharge member to the buffer block.

Effects of the Invention

As described above, in the thermal conductivity detector according to the present invention, it is configured such that the fluid resistance portion is retained by the discharge member detachably attached to the buffer block, and the fluid resistance portion can be detachably attached to the buffer block by detachably attaching the discharge member to the buffer block. Therefore, when clogging has occurred in the fluid resistance portion, the fluid resistance portion can be easily replaced, which in turn can realize both the stabilization of the baseline and the miniaturization of the detector.

EMBODIMENTS FOR CARRYING OUT THE INVENTION

Hereinafter, some embodiments of a thermal conductivity detector according to the present invention will be described with reference to the attached drawings.

Figure 1:
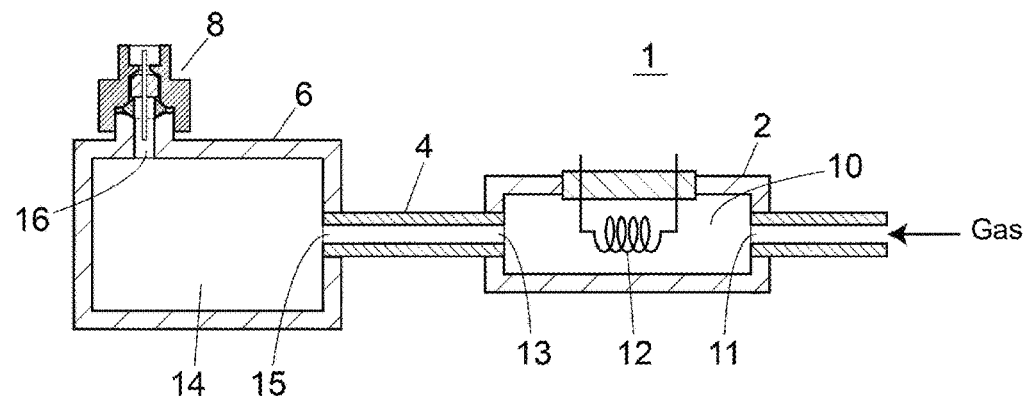
FIG. 1 is a cross-sectional view showing one example of a thermal conductivity detector.

As shown in FIG. 1, the thermal conductivity detector 1 includes a cell block 2, an outlet pipe 4, a buffer block 6, and a discharge member 8.

The cell block 2 is provided therein with a measurement cell 10 in which a filament 12 is arranged. The cell block 2 is provided with a cell inlet 11 for introducing a gas into the measurement cell 10 and a cell outlet 13 for flowing out the gas from the measurement cell 10. One end of the outlet pipe 4 serving as an outlet flow path is fluidly connected to the cell outlet 13 of the cell block 2. The filament 12 is for exchanging heat with the gas flowing through the measurement cell 10. The thermal conductivity detector 1 quantifies the components contained in the gas by reading the signal corresponding to the heat exchange amount between the gas flowing through the measurement cell 10 and the filament 12.

The buffer block 6 is provided therein with a buffer space 14. The buffer block 6 is further provided with an inlet port 15 for introducing the gas into the buffer space 14 and a discharge port 16 for discharging the gas from the buffer space 14. The other end of the outlet pipe 4 is fluidly connected to the inlet port 15 of the buffer block 6. The inner cross-sectional area of the buffer space 14 perpendicular to the inflow direction of the gas from the inlet port 15 is greater than the cross-sectional area of the inner side flow path (i.e., outlet flow path) of the outlet pipe 4 perpendicular to the flow direction. The discharge member 8 is detachably attached to the buffer block 6.

Note that in FIG. 1, only one measurement cell 10 is shown inside the cell block 2. However, two measurement cells 10, i.e., a measurement cell for a sample gas and a measurement cell for a reference gas, may be provided within the cell block 2. In a case where two measurement cells 10 are provided in the cell block 2, these two measurement cells 10 may be fluidly connected to a common buffer space 14, or two buffer spaces 14 may be provided in the buffer block 6, and the two measurement cells 10 may be fluidly connected to the respective separate buffer spaces 14.

Figure 2:
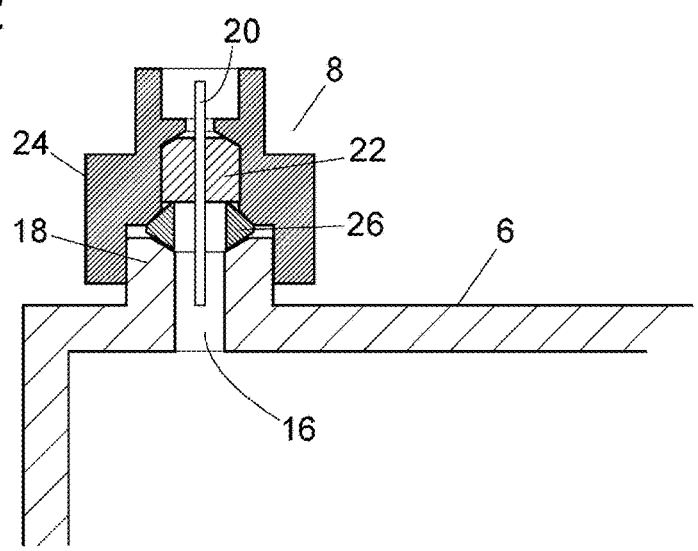
FIG. 2 is a cross-sectional view showing a structure of a discharge member of the same example.

As shown in FIG. 2, the discharge member 8 is provided with a resistance tube 20, a retaining member 22, a fixing member 24, and a seal ring 26. The resistance tube 20 is, for example, a fine linear tube having an outer diameter of 1 mm or less and an inner diameter of 0.5 mm or less. The resistance tube 20 serves as a fluid resistance portion for increasing the fluid resistance of the discharge port 16. The retaining member 22 is made of a resin material (for example, silicone rubber) having elasticity. The retaining member 22 retains the outer peripheral surface of the resistance tube 20 with the resistance tube 20 penetrated therethrough. The fixing member 24 is a metal member having a recess for fitting and holding the retaining member 22. The fixing member 24 is detachably attached to a portion of the buffer block 6 where the discharge port 16 is provided in a state in which the retaining member 22 is retained by the recess.

A cylindrical protrusion 18 is provided at a portion of the outer surface of the buffer block 6 where the discharge port 16 is provided. A thread groove is formed on the outer peripheral surface of the protrusion 18. A thread groove is formed on the inner peripheral surface of the fixing member 24 of the discharge member 8 to be threaded with the thread groove of the outer peripheral surface of the protrusion 18 of the buffer block 6. By rotating the fixing member 24, the discharge member 8 can be attached to and detached from the buffer block 6.

The discharge member 8 is attached to the buffer block 6 such that the resistance tube 20 is in fluidic communication between the buffer space 14 and the atmosphere. A seal ring 26 is sandwiched between the tip of the protrusion 18 of the buffer block 6 and the retaining member 22 of the discharge member 8. The seal ring 26 deforms the resin retaining member 22 at the tip end of the protrusion 18 to enhance the sealing performance, thereby preventing a gas from being discharged from a path other than the resistance tube 20.

With the above-described structure, the fluid resistance of the gas to be discharged from the discharge port 16 increases, reducing the capacitance of the buffer space 14, which in turn can reduce the size of the buffer block 6. Since the resistance tube 20 is fine, sample clogging may occur within the resistance tube 20. However, the detachment/attachment of the discharge member 8 retaining the resistance tube 20 can be easily performed by rotating the fixing member 24, and therefore, the replacement of the resistance tube 20 can be easily performed.

Note that as the fluid resistance portion for increasing the fluid resistance of the discharge port 16, a filter (a metal crystal filter, a ceramic filter, or the like) may be used instead of the resistance tube 20. In this case, the filter may be retained by the retaining member 22 or brazed to the fixing member 24 of the discharge member 8.

Further, the attaching/detaching structure of the buffer block 6 with respect to the discharge member 8 is not limited to those utilizing a threaded engagement as long as the buffer block 6 can be detachably attached to the discharge member 8. Further, the discharge member 8 does not necessarily need to be directly attached to and detached from the buffer block 6, and may be configured to be detachably attached to the buffer block 6 via a pipe.

Figure 3:
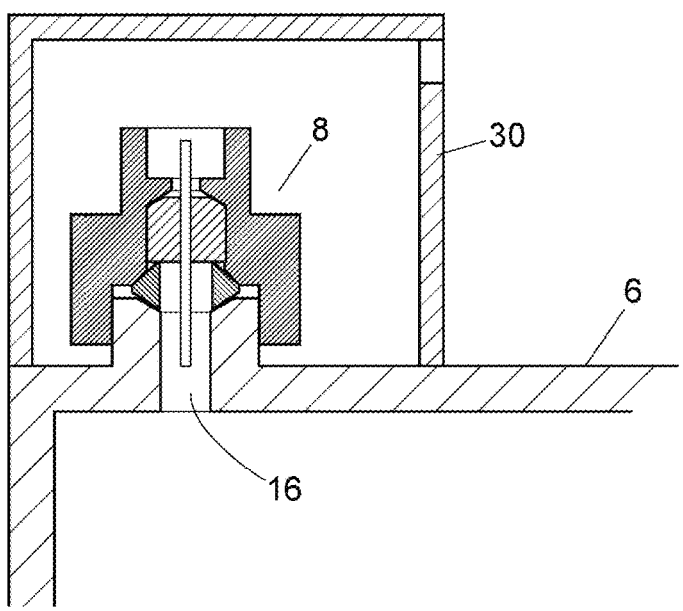
FIG. 3 is a cross-sectional view schematically showing another example of a thermal conductivity detector.
Figure 4:
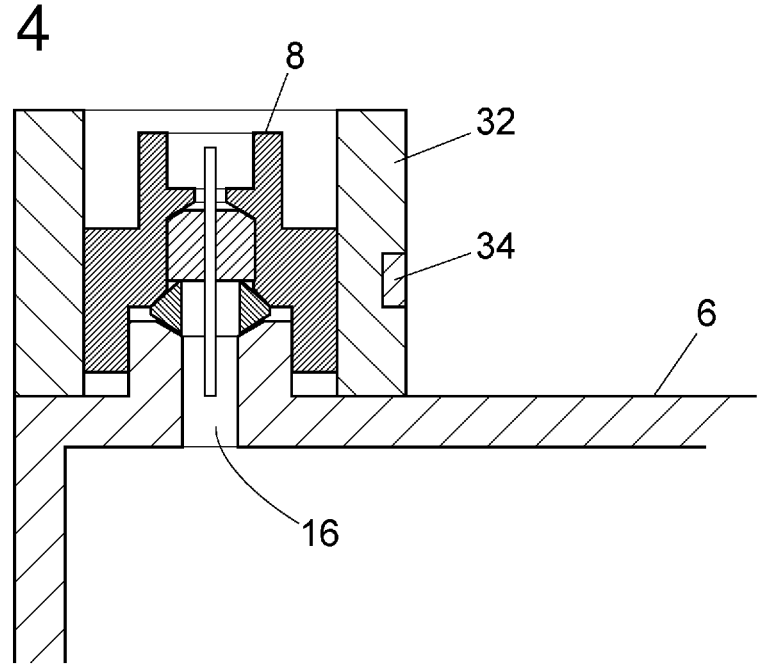
FIG. 4 is a cross-sectional view schematically showing still another example of a thermal conductivity detector.

Further, as shown in FIG. 3 and FIG. 4, a heat retention unit may be provided to prevent the temperature drop of the discharge member 8 to prevent clogging in the fluid resistance portion, such as, e.g., the resistance tube 20. In the example shown in FIG. 3, a heat retention unit is configured by a thermal insulation member 30 surrounding the discharge member 8 to prevent the heat release so that the heat transferred to the discharge member 8 via the metal outlet pipe 4 and the buffer block 6 does not escape. In the example shown in FIG. 4, the heat retention unit is constituted by a metal thermally conductive block 32 in contact with the discharge member 8 and a heater 34 for heating the thermally conductive block 32.

The examples described above merely exemplify embodiments of the thermal conductivity detector according to the present invention. Embodiments of the thermal conductivity detector according to the present invention are as follows.

According to an embodiment of the present invention, a thermal conductivity detector includes:

a cell block provided therein with a measurement cell serving as a space in which a filament for exchanging heat with a gas is arranged, the cell block being provided with a cell inlet for introducing the gas into the measurement cell and a cell outlet for flowing out the gas from the measurement cell;

an outlet flow path communicated with the cell outlet of the cell block;

a buffer block provided therein with a buffer space, the buffer block having an inlet port for introducing the gas into the buffer space and a discharge port for discharging the gas from the buffer space, the inlet port being fluidly connected to the outlet flow path; and a discharge member retaining a fluid resistance portion for increasing fluid resistance of the discharge port, the discharge member being attached to the buffer block such that the gas discharged from the discharge port passes through the fluid resistance portion, the discharge member being configured to be detachable from the buffer block together with the fluid resistance portion.

According to a first aspect of an embodiment of the thermal conductivity detector according to the present invention, the fluid resistance portion is a resistance tube.

In the first aspect of the present invention, an outer diameter of the resistance tube is equal to or less than 1 mm. It is difficult to detachably attach a fine resistance tube having an outer diameter of 1 mm or less to a buffer block by a threaded engagement or the like. However, in the embodiment according to the present invention, the resistance tube can be attached to and detached from the buffer block in accordance with the attachment/detachment of the discharge member, and therefore, even in the case of a fine resistance tube, the replacement can be easily performed.

Further, in the first aspect of the present invention, the discharge member may include:

a retaining member retaining an outer peripheral surface of the resistance tube; and a fixing member configured to be detachably fixed to the buffer block in a state of retaining the retaining member.

In the above case, the retaining member may be made of an elastic resin material. With such an aspect, it is possible to prevent the fine resistance tube from being bent.

In a second aspect of the embodiment of the thermal conductivity detector according to the present invention, the fluid resistance portion is a filter.

In a third aspect of the embodiment of the thermal conductivity detector according to the present invention, the thermal conductivity detector further includes a heat retention unit configured to prevent a temperature drop of the discharge member. With such an aspect, it is possible to suppress clogging of a fluid resistance portion by a sample.

In the above-described third aspect of the present invention, the heat retention unit may be provided with a thermally conductive block in contact with the discharge member and a heater for heating the thermally conductive block.

DESCRIPTION OF SYMBOLS

1: Thermal conductivity detector
2: Cell block
4: Outlet pipe
6: Buffer block
8: Discharge member
10: Measurement cell
11: Cell inlet
12: Filament
13: Cell outlet
14: Buffer space
15: Inlet port
16: Discharge port
18: Protrusion
20: Resistance tube (fluid resistance portion)
22: Retaining member
24: Fixing member
26: Seal ring
30: Thermal insulation member
32; Thermally conductive block

The invention claimed is:

1. A thermal conductivity detector comprising:

a cell block provided therein with a measurement cell serving as a space in which a filament for exchanging heat with a gas is arranged, the cell block being provided with a cell inlet for introducing the gas into the measurement cell and a cell outlet for flowing out the gas from the measurement cell;

an outlet flow path communicated with the cell outlet of the cell block;

a buffer block provided therein with a buffer space, the buffer block having an inlet port for introducing the gas into the buffer space and a discharge port for discharging the gas from the buffer space, the inlet port being fluidly connected to the outlet flow path; and a discharge member integrally including a resistance tube for increasing fluid resistance of the discharge port, the discharge member being attached to the buffer block such that the gas discharged from the discharge port passes through the resistance tube, the discharge member being configured to be detachable from the buffer block, wherein a protrusion is provided at a portion of an outer surface of the buffer block where the discharge port is provided, the resistance tube has an outer diameter smaller than an inner diameter of the discharge port and has a fluid resistance higher than that of the discharge port, and the discharge member is attached to the protrusion of the buffer block in a state where one end of the resistance tube is positioned inside of the discharge port.

2. The thermal conductivity detector as recited in claim 1, wherein the outer diameter of the resistance tube is equal to or less than 1 mm.

3. The thermal conductivity detector as recited in claim 1, wherein the discharge member includes:

a retaining member retaining an outer peripheral surface of the resistance tube; and a fixing member configured to be detachably fixed to the protrusion of the buffer block in a state of retaining the retaining member.

4. The thermal conductivity detector as recited in claim 3, wherein the retaining member is made of an elastic resin material.

5. The thermal conductivity detector as recited in claim 1, further comprising:

a heat retention unit configured to prevent a temperature drop of the discharge member.

6. The thermal conductivity detector as recited in claim 5, wherein the heat retention unit is provided with a thermally conductive block in contact with the discharge member and a heater for heating the thermally conductive block.

* * * * *